United States Patent [19]

Yli-Vakkuri

[11] Patent Number: 5,680,217
[45] Date of Patent: Oct. 21, 1997

[54] METHOD FOR MEASURING THE DEGREE OF BENDING IN A BENT GLASS SHEET

[75] Inventor: Erkki Yli-Vakkuri, Tampere, Finland

[73] Assignee: Tamglass Engineering OY, Tampere, Finland

[21] Appl. No.: 655,856

[22] Filed: May 31, 1996

[30] Foreign Application Priority Data

May 31, 1995 [FI] Finland .................................. 952638

[51] Int. Cl.⁶ .................................................. G01B 11/24
[52] U.S. Cl. .......................... 356/376; 356/377; 364/559; 364/560
[58] Field of Search ........................... 356/376, 377; 364/559, 560

[56] References Cited

U.S. PATENT DOCUMENTS

| | | | |
|---|---|---|---|
| 4,928,175 | 5/1990 | Haggrén. | |
| 5,424,836 | 6/1995 | Weise et al. | 356/376 |
| 5,501,717 | 3/1996 | Vehmas et al. | 65/104 |

*Primary Examiner*—Frank G. Font
*Assistant Examiner*—Reginald A. Ratiff
*Attorney, Agent, or Firm*—Burns, Doane, Swecker & Mathis, L.L.P.

[57] ABSTRACT

The invention relates to a method for measuring the degree of bending in a bent glass sheet. The measuring is effected by cameras having a common imaging field within the boundaries of a surface being measured. The cameras are set at an arbitrary but stationary angle relative to each other. The glass surface along a profile to be measured is made visible to the cameras by an illuminating line whose light has a high intensity over the wavelength ranges of 250–330 nm. Hence, an extremely thin film of tin, left on the glass surface in the manufacture thereof, becomes visible.

15 Claims, 2 Drawing Sheets

METHOD FOR MEASURING THE DEGREE OF BENDING IN A BENT GLASS SHEET

BACKGROUND AND SUMMARY OF THE INVENTION

The present invention relates to a method for measuring the degree of bending in a bent glass sheet.

For example, in the gravitational bending of automotive windshields and backlights, the degree of bending is difficult to control with sufficient accuracy. After a bending operation, it is necessary to check the degree of bending in order to discard the incorrectly bent pieces. This has been done by using mechanical equipment, wherein the glass is secured to a checking bench and mechanical tracers are used for checking the degree of bending at certain points. This is a slow and tedious process and the number of checking points is limited. The necessity for measuring the degree of bending also involves glasses that have been bent with a "pressbend" method or by means of an arching conveyor. Thus, the question may be about measuring the final bending of bent tempered glass produced by means of a roller equipped furnace.

Patent publication U.S. Pat. No. 4,928,175 discloses a method for the three-dimensional monitoring of a target space with two or more video cameras, which are set at an arbitrary but stationary angle relative to each other and which have a common imaging field in which a target to be monitored is located. However, this prior known method is not as such suitable for measuring the degree of bending in a glass sheet, since glass is transparent over the band of wavelengths detected by the cameras.

An object of the invention is to provide a method, whereby said camera-imaging based technique can be applied to measuring the degree of bending in a glass sheet.

BRIEF DESCRIPTION OF THE DRAWINGS

The invention will now be described in more detail with reference made to the accompanying drawings, in which.

DETAILED DESCRIPTION

Figure 1:
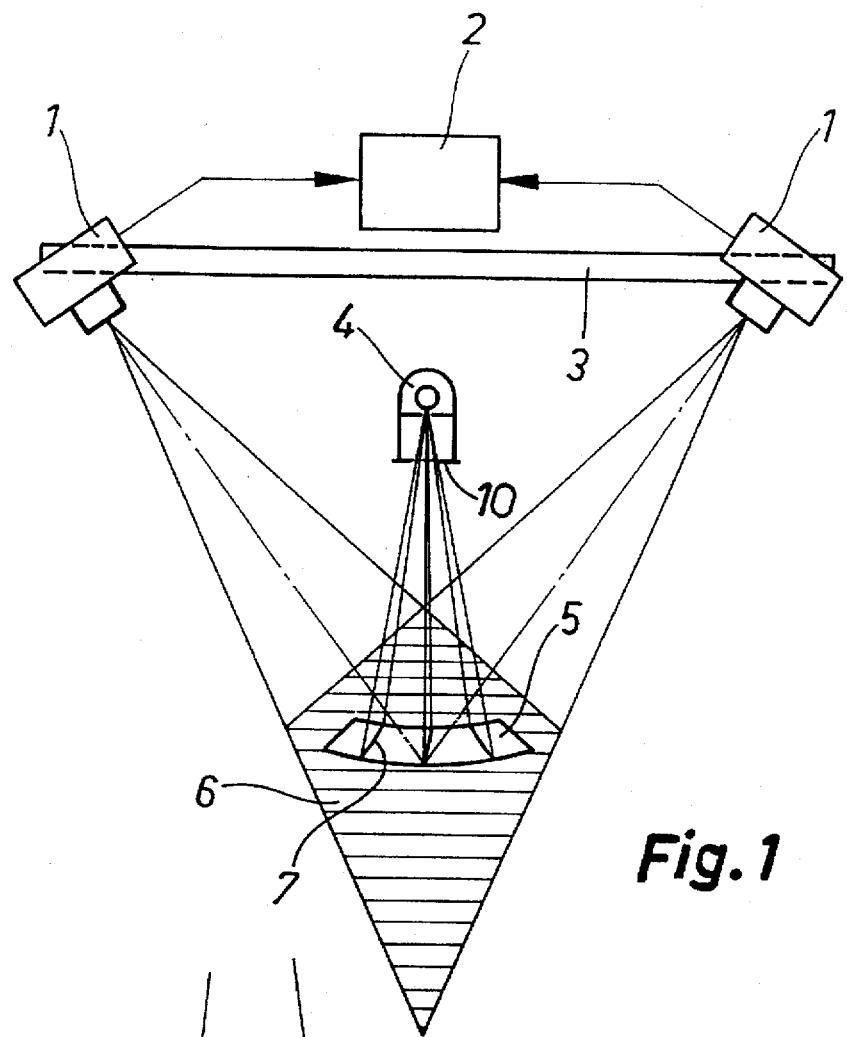
FIG. 1 shows a schematic view of an apparatus for carrying out a method according to the present invention.

The structural design of an apparatus used in the method is as follows. As seen in FIG. 1, at least two video cameras 1 are mounted on a common frame 3, such that the cameras 1 remain at a stationary angle relative to each other. This angle can be arbitrarily selected, yet in such a manner that the cameras 1 have a common imaging field which covers the object of measuring. The video signals produced by the cameras 1 are processed in a computer 2 as described in Patent publication U.S. Pat. No. 4,928,175. The same applies also to the calibration of a measuring system, i.e., determination of the bearing factors of the cameras by means of known points.

A glass sheet 5, whose bending profile is being measured, is placed within an imaging field 6 common to the cameras. During the course of imaging, the glass sheet is not required to have any precise disposition or attitude. Thus, the measuring can be effected directly from the conveying track. Above the measuring point is set a light source 4, whose light has a high intensity over the wavelength range of 250–330 nm. Thus, the extremely thin layer of tin formed on one surface of the glass during its manufacturing becomes visible to the cameras 1. An illuminator having a powerful intensity at the wavelength of 253.7 nm has been used earlier for illuminating a glass surface after visually inspecting on which surface of the glass a layer of tin is formed. In the invention, this per se known phenomenon is exploited in a new type of measuring method.

Figure 2:
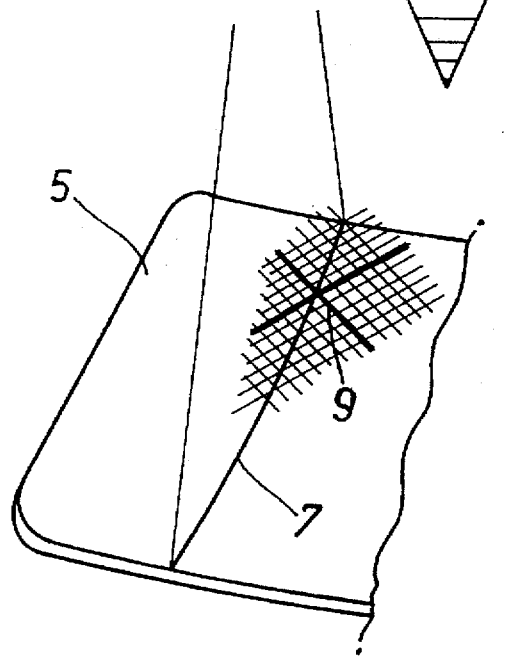
FIG. 2 shows an end section of a bent glass sheet, whose curvature profile is being measured according to the present invention.

Between the light source 4 and the glass 5 is provided a slit screen 10, admitting therethrough one or more light beams for producing an illuminating line 7, seen in FIGS. 1 and 2, on the surface of glass 5. Thus, a desired number of illuminating lines are produced at locations whose curvature profile is to be measured. Optionally, the screen 10 can be manipulated in such a manner that the illuminating line 7 shifts to various locations on the surface of glass 5, the curvature profiles of the corresponding points being measured sequentially.

Figure 3:
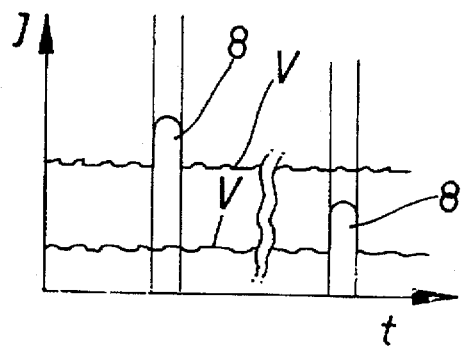
FIG. 3 is a graph of video signals for a pair of cameras used for measuring.

With the present assembly, the measuring is effected as follows. The image fields of both video cameras 1 are scanning crisscrossing lines 9. Video signals V of both cameras 1 receive an intensity pulse whenever the cameras detect the illuminating line 7 on the glass surface. Thus, during each field line of both cameras 1 there occurs a pulse 8, seen in FIG. 3, whose moment of occurrence is determined by which pixel of a CCD-image field the pulse originates from. Since, after calibrating the measuring system, the relative disposition of cameras is known, the relative disposition of pulses 8 occurring during each pair of lines can be used for determining the 3-D coordinates of a point of the illuminating line 7 falling on the crossing point of lines 9. Depending on the number of image points included in the CCD-image fields of cameras 1, it is possible to determine the 3-D coordinates of even more than 200 points for indicating the surface curvature profile along the illuminating line 7.

In addition to this, it is possible to determine the curvature profile of glass sheet edges by placing at least two cameras 1 in such a manner that both have the same edge surface of a glass sheet within their field of vision. It has been unexpectedly discovered that illumination of a surface of the glass sheet 5 with the light source 4 sheds light also on a glass sheet edge surface. This "illumination" of a glass edge can also be used for measuring the glass size as both cameras are able to see the opposite glass edge surfaces or the entire glass outline.

The invention can be applied in a second bending examination effected downstream of a bending furnace. Thus, the measured curvature profile is compared to a predetermined profile and, if an anomaly exceeding a certain limit is detected as a result of the comparison, the glass sheet is rejected. The invention can also be applied to the regulation of a bending process in such a manner that, if anomalies exceed a certain limit, a regulation or adjustment of the bending process is effected in order to compensate for the anomalies. In this application, it is of course necessary to monitor both the distribution and average of the bending.

In another application of the invention, the measuring result, i.e., the 3-D coordinates of predefined points, the coordinates being the result of measuring by the method according to the present invention, can be compared to the points of the real CAD-file of glass, i.e., the 3-D points of the glass sheet in a CAD-file designed to show the desired shape and size of the bent glass, or to a surface formed thereby. The desired shape of a glass surface is also defined by 3-D coordinates in the CAD-file. If the measured coordinates of certain points deviate from the CAD-file coordinates of corresponding points more than a certain limit, the glass sheet may be rejected and/or the bending process may be adjusted.

The minimum number of cameras required for carrying out the measuring is two. In practice, however, the number of cameras may be more than that, typically, e.g., four cameras.

Figure 4:
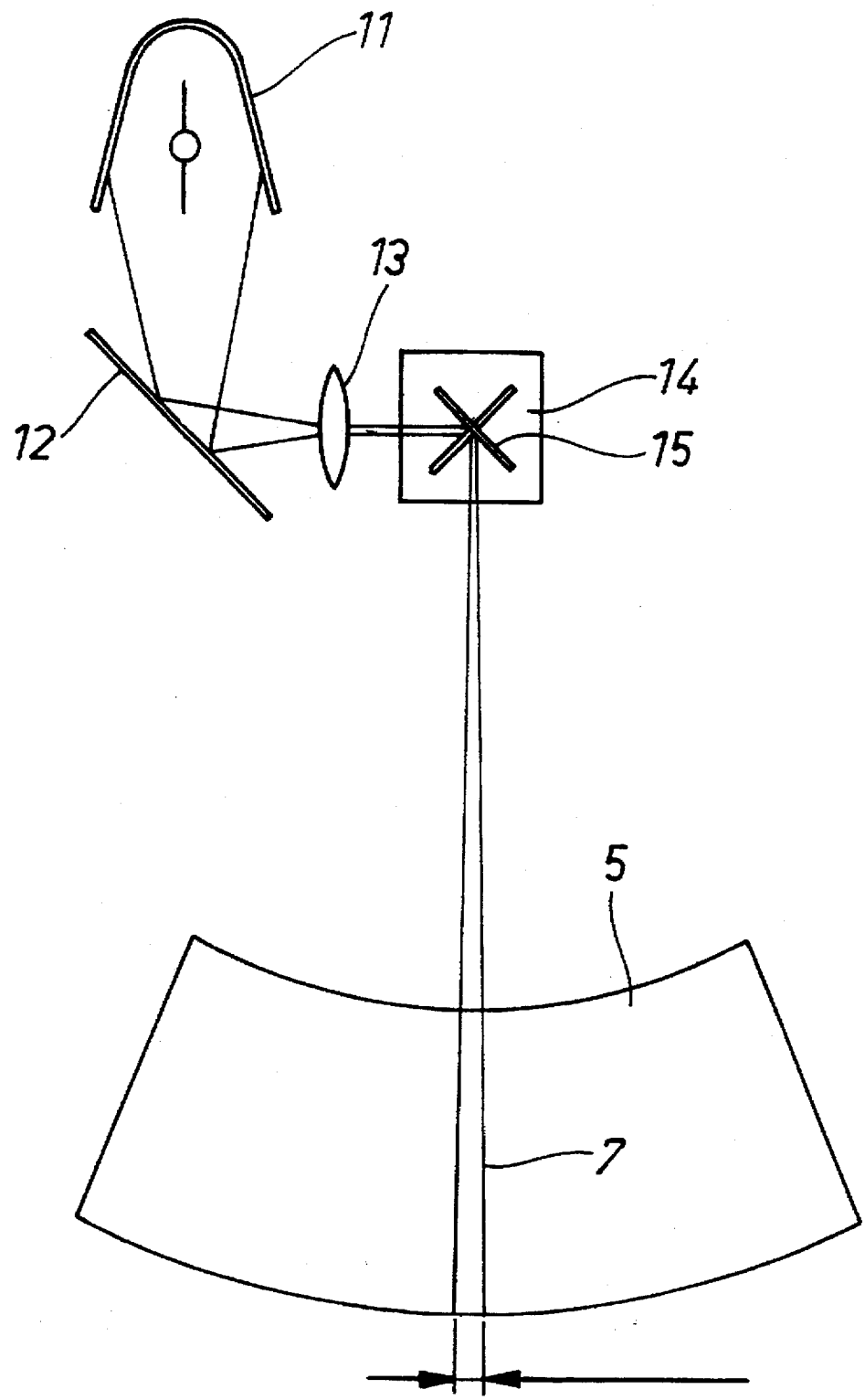
FIG. 4 is a schematic view of a preferred illumination apparatus for illuminating the surface of a glass sheet so as to produce at a desired point on the glass sheet surface an illuminating line visible to the cameras according to an embodiment of the present invention.

The illumination system shown in FIG. 4 comprises a high-pressure mercury vapour lamp 11, having a relatively high intensity also over the UV-range. A diffraction mirror 12 and a collimation lens 13 are used for focusing the beam of light on an x-y-mirror 15, which is included in a scanner 14 and capable of maneuvering in x-y-directions the light beam directed at the glass surface. The line scanning occurs, e.g., in y-direction and the interline field deflection in x-direction. The line may have a width of up to 20–30 mm.

Filters positioned in the path of light as well as selections of mirrors and reflective surfaces can be used for limiting the wavelength band, such that the beam of light mainly comprises radiation having the desired wavelength range of 250–330 nm. The glass sheet 5 carries a small amount of tin also on that surface which has been the top surface during the manufacturing process. The illumination system shown in FIG. 4 is sufficiently effective for making the illuminating line 7 visible also on this surface which carries a considerably lesser amount of tin.

For example, the helium-cadmium laser emits laser light of 325 nm, which is capable of producing fluorescence points on a glass surface. Thus, the invention is also operable by means of laser light but the illumination system of FIG. 4 is more effective in terms of its illuminating qualities as well as more economic in terms of its price when compared to laser-light sources commercially available on the filing application.

The invention is not limited to the above embodiment. For example, the illuminating line 7 on the glass surface need not be continuous but it may consist of a number of points or a single moving point. The source of light 4 may comprise a fluorescent tube or a laser capable of producing a required wavelength. The light can also be brought from a light source to a target by means of a photoconducting cable. The term "light" as used in this context must be understood comprehensively so as to comprise electromagnetic radiation wavelengths outside visible light, particularly the wavelength band of 250–330 nm within the UV-range. While this invention has been illustrated and described in accordance with a preferred embodiment, it is recognized that variations and changes may be made therein without departing from the invention as set forth in the claims.

What is claimed is:

1. A method for measuring a degree of bending in a bent glass sheet, comprising the steps of:
   providing a glass sheet having a surface with a film of metal thereon;
   setting two or more cameras at an arbitrary but stationary angle relative to each other such that the cameras have a common imaging field within boundaries of the surface of the glass sheet being measured; and
   focusing light of a wavelength having a high intensity within an ultraviolet range on the surface to make the film of metal visible to the cameras,
   wherein the glass sheet is substantially transparent to light over a band of wavelengths detectable by the cameras until the film of metal is provided on the surface thereof.

2. A method as set forth in claim 1, wherein light is focused on the surface in the form of an illuminating line along a profile being measured.

3. A method as set forth in claim 1, wherein the light has a high intensity over the wavelength range of 250–330 nm.

4. A method as set forth in claim 3, wherein light is focused on the surface in the form of an illuminating line along a profile being measured, and the illuminating line is used for determining therealong 3-D coordinates for a plurality of points, the coordinates corresponding to a surface curvature profile along the illuminating line.

5. A method as set forth in claim 4, wherein a plurality illuminating lines are focused on the surface, the method comprising the further step of measuring a curvature profile at a corresponding plurality of different points.

6. A method as set forth in claim 4, comprising the further steps of comparing the measured curvature profile to a predetermined profile and rejecting a glass sheet when an anomaly exceeding a certain limit is detected as a result of the comparison.

7. A method as set forth in claim 4, comprising the further steps of comparing the measured curvature profile to a predetermined profile and, when anomalies exceeding a certain limit are detected as a result of the comparison, adjusting the bending process to compensate for the anomalies.

8. A method as set forth in claim 1, wherein the at least two cameras each have a field of vision, the at least two cameras being positioned such that both cameras have a safe edge surface of the glass sheet within their respective fields of vision.

9. A method as set forth in claim 1, comprising the further step of sweeping the focused light along the surface.

10. A method as set forth in claim 8, comprising the further steps of processing signals corresponding to light detected by the cameras to measure coordinates of a number of points along the edge surface of the glass sheet and provide a measuring result.

11. A method as set forth in claim 10, comprising the further step of comparing the measuring result to stored coordinates of a desired glass sheet shape and size.

12. A method as set forth in claim 1, wherein light is focused on the surface in the form of a number of luminous points along a profile being measured.

13. A method as set forth in claim 1, comprising the further step of processing signals corresponding to light detected by the cameras to determine 3-D coordinates of points on the surface.

14. A method as set forth in claim 4, comprising the further steps of translating the illuminating line along the surface, and measuring surface curvature profiles at a plurality of different points along the surface as the illuminating line is translated.

15. A method as set forth in claim 1, wherein the at least two cameras each have a field of vision, the at least two cameras being positioned such that both cameras have opposite edge surfaces of the glass sheet within their respective fields of vision.

* * * * *